(12) United States Patent
Mittal (10) Patent No.: US 8,612,411 B1
(45) Date of Patent: Dec. 17, 2013

(54) CLUSTERING DOCUMENTS USING CITATION PATTERNS

(75) Inventor: Vibhu O. Mittal, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 541 days.

(21) Appl. No.: 10/750,186

(22) Filed: Dec. 31, 2003

(51) Int. Cl.
 *G06F 17/30* (2006.01)
(52) U.S. Cl.
 CPC ...... *G06F 17/3071* (2013.01); *G06F 17/30728* (2013.01); *G06F 17/30864* (2013.01)
 USPC .......................... 707/706; 707/739; 707/750
(58) Field of Classification Search
 USPC ................ 707/2, 3, 5, 6, 102, 706, 739, 750, 707/705–709, 999.001–999.01; 715/513
 See application file for complete search history.

(56) References Cited

U.S. PATENT DOCUMENTS

| | | | |
|---|---|---|---|
| 6,038,561 A * | 3/2000 | Snyder et al. ........................ 1/1 |
| 6,289,342 B1 | 9/2001 | Lawrence et al. |
| 6,349,296 B1 * | 2/2002 | Broder et al. ...................... 707/3 |
| 6,411,962 B1 * | 6/2002 | Kupiec .......................... 707/102 |
| 6,442,545 B1 * | 8/2002 | Feldman et al. ................... 707/6 |
| 6,457,028 B1 * | 9/2002 | Pitkow et al. ................... 715/513 |
| 6,658,423 B1 * | 12/2003 | Pugh et al. ...................... 707/102 |
| 6,847,966 B1 * | 1/2005 | Sommer et al. ................... 707/5 |
| 6,856,988 B1 * | 2/2005 | Humphrey et al. ................ 707/7 |
| 6,886,010 B2 * | 4/2005 | Kostoff ............................ 707/3 |
| 6,990,628 B1 * | 1/2006 | Palmer et al. ................. 715/234 |
| 2004/0049503 A1 * | 3/2004 | Modha et al. .................... 707/3 |
| 2004/0133560 A1 * | 7/2004 | Simske .............................. 707/3 |
| 2005/0143971 A1 * | 6/2005 | Burstein et al. .................... 704/4 |
| 2005/0165736 A1 * | 7/2005 | Oosta ................................ 707/2 |

OTHER PUBLICATIONS

M.M. Kessler, "Bibliographic Coupling Between Scientific Papers," Jan. 1963, American Documentation, vol. 14, Issue 1, pp. 10-25.*
Bella Hass Weinberg, et al. "Bibliographic Coupling: A Review," 1974, Pergamon Press, Information Storage and Retrieval: Theory and Practice, vol. 10, p. 189-196.*
S. Schiminovich, "Automatic Classification and Retrieval of Documents by Means of a Bibliographic Pattern Discovery Algorithm," 1971, Pergamon Press, vol. 6, p. 417-435.*
Donna Trivision, "Term Co-Occurrence in Cited/Citing Journal Articles as a Measure of Document Similarity," 1987, Information Processing and Management, vol. 23, Issue 3, p. 183-194.*

* cited by examiner

*Primary Examiner* — Christyann Pulliam
*Assistant Examiner* — Charles Adams
(74) *Attorney, Agent, or Firm* — Fish & Richardson P.C.

(57) ABSTRACT

Systems and methods for clustering documents, such as for scientific documents, taking into account the citation patterns of the documents are disclosed. In one embodiment, the method includes locating citations to other documents, e.g., search result documents, comparing each pair of documents to be clustered for overlapping citations in a first, a more specific second, and an even more specific optional third citation generality, and determining clusters of related documents based on the comparisons. The levels of generalities may be, for example, document-, paragraph-, and/or citation-level generalities. The locating may locate only citations to the other documents to be clustered. The clusters may be determined based on a weighted score of the amount of overlapping citations in the various generalities and/or by performing factor analysis using the comparison results. The clusters may be ranked to determine the dominant clusters.

30 Claims, 4 Drawing Sheets

CLUSTERING DOCUMENTS USING CITATION PATTERNS

BACKGROUND OF THE INVENTION

1. Field of the Invention

The present invention relates generally to clustering of documents. More specifically, systems and methods for clustering documents, such as for scientific documents, taking into account the citation patterns of the documents are disclosed.

2. Description of Related Art

When a search returns multiple search result documents, it is often useful to provide the search result documents to the user in a number of coherent and logical groups or clusters. However, as with most documents, similarities among the documents can be compared across multiple dimensions or directions. As an example, a document set containing documents pertaining to both mathematics and physics may be divided into a mathematics group and a physics group. However, the same document set may also be divided along an orthogonal dimension into theoretical and experimental groups. As is evident, division of the document set along other dimensions may also be possible.

In the absence of any context, dominant clusters are often generated. Dominant clusters generally refer to a relatively small number of relatively large groups where each member of a given group is coherent with other members in the same group along some dimension. The generation of dominant clusters is a well studied concept and can be optimized using a number of measures. However, search engine results are generally presented in an order ranked in accordance with the relevance of the documents to the search query without regard to the relevance that the search result documents have to each other. It would be desirable to group the search result documents, particularly for scientific documents, into logical and coherent clusters such that the search result may be presented in a more meaningful manner to the user.

SUMMARY OF THE INVENTION

Systems and methods for clustering documents, such as for scientific documents, taking into account the citation patterns of the documents are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

According to one embodiment, the method generally includes locating citations to other documents, comparing each pair of documents to be clustered for overlapping citations in a first, a more specific second, and an even more specific optional third citation generality, and determining clusters of related documents based on the comparisons. The levels of generalities may be, for example, document-, paragraph-, and/or citation-level generalities. The documents may be selected, for example, from search result documents as generated by a search engine. The locating may locate only citations to the other documents to be clustered. The clusters may be determined based on a weighted score of the amount of overlapping citations in the various generalities and/or by performing factor analysis e.g., principal component analysis and/or principal factor analysis, using the comparison results. The clusters may be ranked to determine the dominant clusters based at least in part on documents in each cluster containing only overlapping citations with other documents in the less specific citation generality or generalities.

In another embodiment, a system for clustering documents includes a citations locator configured to locate citations in documents to be clustered, a document pair comparator configured to compare each pair of documents for overlapping citations in a first and a second more specific citation generality, and an analyzer configured to determine clusters of related documents based on the comparisons.

In a further embodiment, a computer program product embodied on a computer-readable medium, the computer program product including instructions, which when executed by a computer system, are operable to cause the computer system to perform acts including locating citations to other documents, comparing each pair of documents to be clustered for overlapping citations in a first and a second more specific citation generality, and determining clusters of related documents based on the comparisons.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods for clustering documents, such as for scientific documents, taking into account the citation patterns of the documents are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

The systems and methods for clustering documents described herein take into account citation patterns of the documents to be clustered, such as documents in HTML. In particular, given clustering terms (i.e., terms forming the basis on which clustering may be performed) such as terms in a search query, e.g., "mathematical physics," the engine may generate the coherent and logical clusters, e.g., an experimental cluster and a theoretical cluster, by examining the citation patterns of the documents or selected documents. The systems and methods for clustering documents are particularly suited for application to scientific documents, but may be employed for numerous other suitable types of documents such as economics, political, literary, art, etc. In addition, search result documents returned by a search of a particular database, e.g. a database of computer science or medical science documents, may be better suited to be clustered using the systems and methods as described herein. Furthermore, although the systems and methods for clustering documents are suitable for use with search result documents, various other document sets may be clustered using the systems and methods as described herein. It is to be understood that although the examples are described and illustrated herein in terms of search results in response to a query, various other documents sets may be similarly clustered using the systems and methods described herein.

Figure 1:
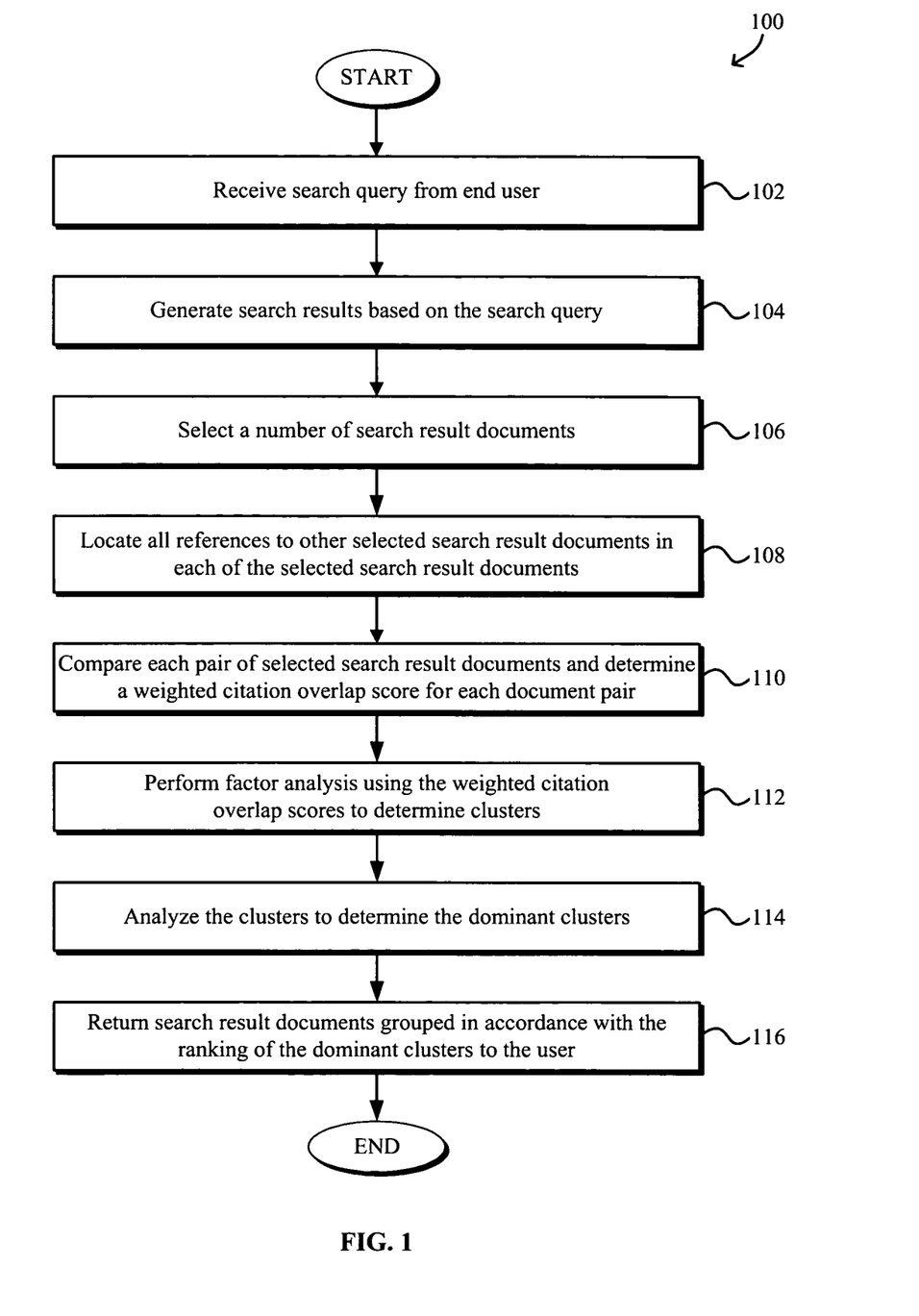
FIG. 1 is a flowchart illustrating an exemplary process for analyzing and clustering search result documents.

FIG. 1 is a flowchart illustrating an exemplary process 100 for analyzing and clustering search result documents. At block 102, an end user via, for example, a client or end user device, enters and transmits a search query. At block 104, a search based on the search query is performed to generate search results. Typically, the search results include links to multiple search result documents. Optionally, a subset of the search result documents may be selected for analysis and clustering at block 106. Typically, search engines rank or order the search results in some manner and, merely by way of example, the top or first 200 search result documents may be selected for analysis and clustering. Alternatively, another subset or all of the search result documents may be analyzed and clustered.

At block 108, each of the selected search result documents are examined to locate citations, i.e., references, to other selected search result documents. Citations to documents are typically found directly in the text of the source document, in footnotes at the bottom of each page, in endnotes and/or a bibliography at the end of the document, etc. It is noted that various suitable mechanisms for locating citations may be employed, such as by using a suitable statistical model of text formatting and/or lexical cues. In one embodiment, only citations to the other selected search result documents are located. Alternatively, citations to all search result documents, all documents or various other combination of documents, for example, may be located.

Figure 2:
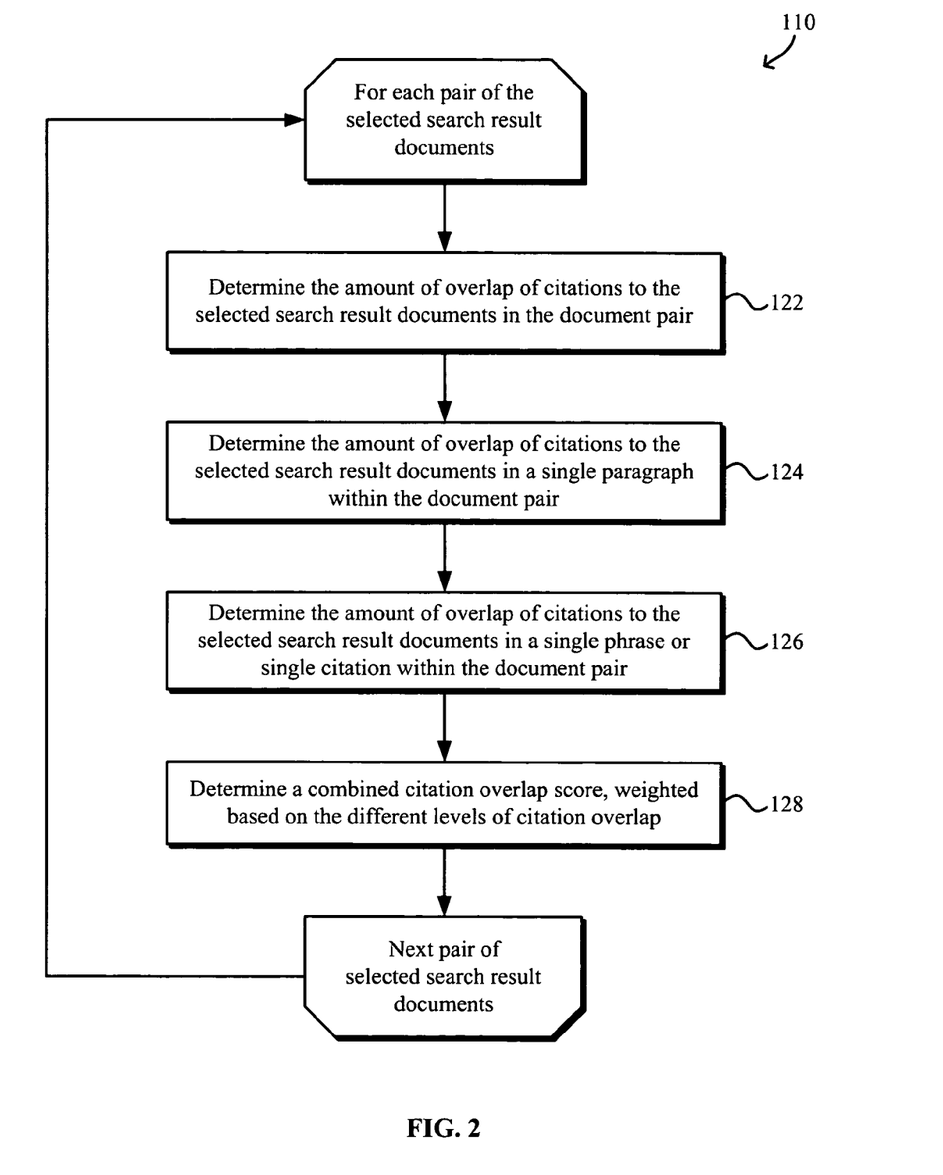
FIG. 2 is a flowchart illustrating an exemplary process for comparing pairs of search result documents and determining a weighted citation overlap score for each document pair.

At block 110, each pair of the selected search result documents are compared to determine a weighted citation overlap score for each document pair, as illustrated in and described with reference to the flowchart of FIG. 2. As shown in FIG. 2, each pair of the selected search result documents are compared in process 110. In other words, if there are N selected search result documents, then there are $(N^2-N)/2$ pairs of selected search result documents and $(N^2-N)/2$ comparisons are made. Each pair of selected search result documents are compared to determine the amount of citation overlap using various citation overlap criteria or citation generality in blocks 122, 124, 126.

For example, in block 122, the amount or level of overlap of citations to the selected search result documents in the document pair, i.e., overlap in document-level citations, is determined. Document-level citations generally refer to citations within the document as a whole such as those listed in a bibliography at the end of the document, as compared to citations occurring within the document, such as those listed within or after specific sentences, paragraphs or other sections within the document. Although all citations may be taken into account in process 110, only citations to the selected search result documents are taken into account for the current example. The determination made in block 122 facilitates the determination of the degree to which the pair of documents are related to each other. The determination is made based on the premise that two documents containing the same document-level citations are more likely to be related to each other than two documents with completely different document-level citations. The amount of overlap may be determined by, for example, determining the number of same document-level citations to the total number of document-level citations in the two documents, e.g., 8/14. Typically, two related documents will have some overlapping, i.e., common, document-level citations.

In block 124, the amount or level of overlap of citations to the selected search result documents in a single paragraph within the document pair, i.e., overlap in paragraph-level citations, is determined. Paragraph-level citations generally refer to citations in a given paragraph, as compared to document-level citations, for example. A given paragraph may contain citations at multiple locations within the paragraph. Similar to block 122, the determination made in block 124 facilitates the determination of the degree to which the pair of documents are related to each other. The determination in block 124 is made based on the premise that two documents containing the same paragraph-level citations are more likely to be related to each other than two documents with completely different paragraph-level citations.

In block 126, the amount of overlap of citations to the selected search result documents in a single phrase or single citation within the document pair, i.e., overlap in citation-level citations or co-citation overlap, is determined. Citation-level citations generally refer to citations in a same citation, as compared to document-level or paragraph-level citations, for example. For example, a given paragraph may contain multiple citations, each citation being to a corresponding set of document(s). Often, small groups of documents are cited in the same citation or in the same phrase, e.g., [Smith, Jones, Chen] or [1, 2, 6]. Similar to blocks 122 and 124, the determination made in block 124 facilitates the determination of the degree to which the pair of documents are related to each other. The determination in block 126 is made based on the premise that two documents containing the same co-citations are more likely to be related to each other than two documents with completely different co-citations.

It is noted that the levels of citation generality described with reference to blocks 122, 124, and 126 are merely examples and that various other levels of citation generality may be employed. Blocks 122, 124, and 126 merely represent one possible combination of broad, intermediate, and narrow (or more specific) citation generalities, respectively. For example, rather than comparing paragraph-level citations, block 124 may examine the citations in terms of a given page, chapter, section, subsection, sentence, number of sentences, or word distance (e.g., within 100 words). As is evident, overlaps in co-citations included in the determination made in block 126 would also be included in the determination made in block 124 which would in turn be included in the determination made in block 126. In an alternative embodiment, citation overlaps included in the determination made in block 126 may be excluded from the determination made in blocks 124 and 122. Similarly, citation overlaps included in the determination made in block 124 may be excluded from the determination made in block 122 so as to avoid double counting. Further, as is evident, blocks 122, 124, 126 need not be performed in the order as shown in FIG. 2.

At block 128, a citation overlap score is determined from the determinations made in blocks 122, 124, and 126 for each pair of the selected search result documents. The combined citation overlap score may be weighted based on the various levels of citation generality. For example, in one embodiment, the co-citation overlap as determined in block 126 is weighed more heavily than the paragraph-level citation overlap as determined in block 124, which is in turn weighed more heavily than the document-level citation overlap as determined in block 122.

Referring again to FIG. 1, after computing the amount of citation overlap for each search result document pair and taking into account the type or level of citation generality by weighting the different generality levels of citation overlaps in block 110, many of the possible document clusters may be determined in block 112. For example, factor analysis such as principal component analysis (PCA) and/or principal factor analysis (PFA) may be employed to determine the possible clusters. It is noted that for computational efficiency purposes, not all possible clusters are computed and generally only a relatively small number of clusters are identified. For example, a threshold for the weighted citation overlap score may be set at a level such that a relatively small number of clusters is identified.

The term factor analysis as used herein generally refers to PCA, PFA and/or various other suitable analysis methodologies. Factor analysis is also applied to a data set as a structure detection technique to detect structure in the relationships among variables (classification). Factor analysis is applied to a data set as a data reduction technique to reduce the number of variables (linear combination into a smaller number of variables or principal components). The first principal component generated accounts for as much of the variability in the data as possible with each succeeding component accounting for as much of the remaining variability in the data set as possible. In general, PCA assumes that all variability in an item should be used in the analysis while PFA uses the variability in an item that it has in common with the other items. In most cases, PCA and PFA yield very similar results although PCA is often used for data reduction while PFA is often used to detect structure.

At block 114, the possible clusters may optionally be analyzed to determine the dominant clusters. Each cluster may be assigned a cluster score that may be, for example, an average of the weighted citation overlap score for each document pair in the cluster. For example, the scores for a given cluster may be adjusted by penalizing the score, for example, for document pairs in the cluster that contain only document-level overlapping citations as determined in block 122 and/or only document-level and/or paragraph-level overlapping citations as determined in blocks 122 and 124. The dominant clusters are then selected based on the adjusted scores for the clusters. A threshold for a maximum number of dominant clusters, e.g., 10, and/or a threshold for a minimum number of documents in a dominant cluster, e.g., 5, may be predetermined and set so as to generate coherent and logical dominant clusters that would be meaningful to the end user. In one embodiment, the documents that are not assigned to one of the dominant clusters may be clustered in a catch-all or miscellaneous cluster. At block 116, the search results, grouped in accordance with the rankings of the dominant clusters, are returned to the end user. The clusters may be explicitly identified in the search result. In one embodiment, the documents within each cluster are presented in accordance with their ranking or order returned by the search engine.

Figure 3:
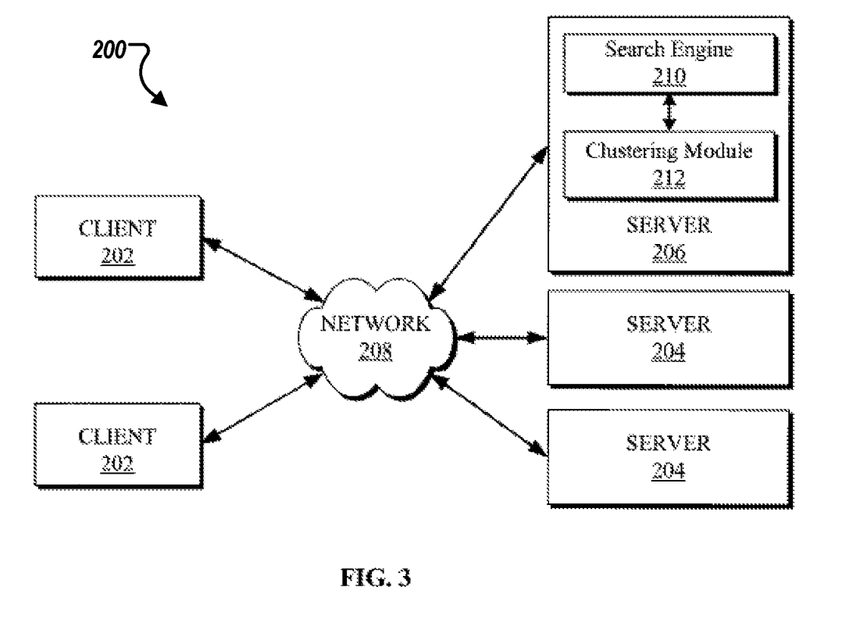
FIG. 3 is a block diagram of an illustrative network system.

FIG. 3 illustrates an exemplary networked system 200 in which systems and methods described herein may be implemented. The networked system 200 may include client devices 202 in communication with servers 204 and 206 via a network 208. The network 208 may be a local area network (LAN), a wide area network (WAN), a telephone network, such as the Public Switched Telephone Network (PSTN), an intranet, the Internet, or a variety of other suitable combination of networks. For purposes of clarity, two client devices 202 and three servers 204 and 206 are illustrated as connected to the network 240. However, other suitable number of client devices 202 and servers 204, 206 may be connected via the network 240. In addition, a given client device may perform the functions of a server and a server may perform the functions of a client device. The client devices 202 may include devices, such as mainframes, minicomputers, personal computers, laptops, personal digital assistants, or the like, capable of connecting to the network 208. The client devices 202 may transmit data over the network 208 and/or receive data from the network 208 via a wired (e.g., copper, optical, etc.) and/or wireless connection.

The servers 204 and/or 206 may store documents (e.g., web documents) accessible by the client devices 202. In one implementation, the server 206 may include a search engine 210 usable by the client devices 202. The server 206 may additionally include a document clustering generator, engine or module 212. The document clustering module 212 enables the server to analyze and determine dominant document clusters from a selected subset of or all the search result documents. The document clustering module 212 may be implemented as part of or in addition to the search engine, for example.

Typically, the document clustering module is implemented on the server side. However, alternatively or additionally, the document clustering module may be implemented on the client side via the client device 202. For example, the client side application corresponding to the source document may implement the document clustering module 212 via a toolbar, a dynamic link library (DLL) or various other types of plug-ins, applications, or various other suitable mechanism to implement the desired functionality in the client side application.

Figure 4:
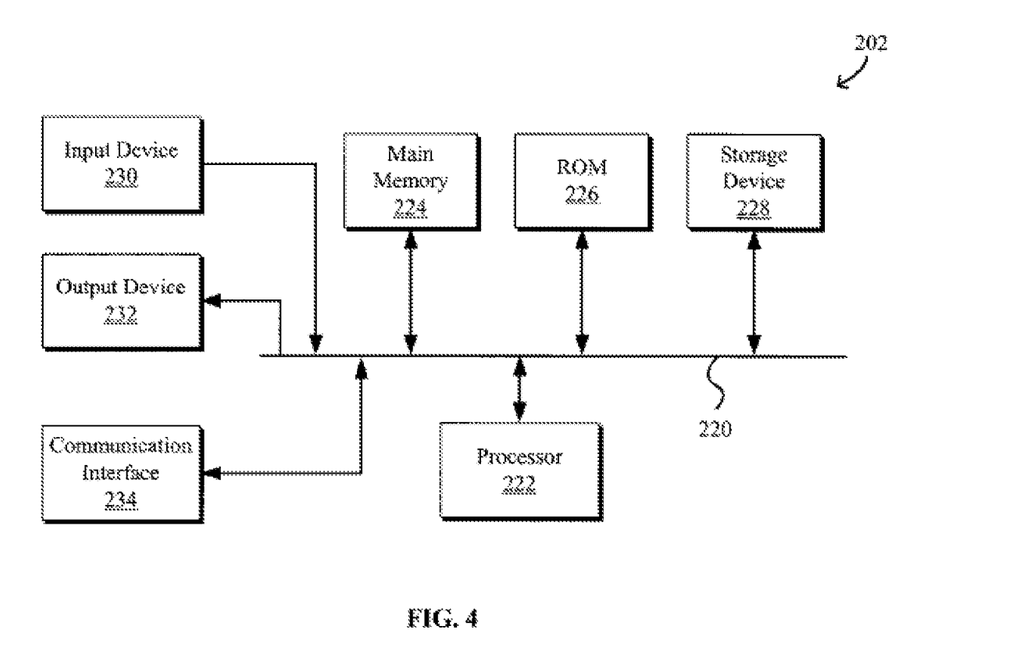
FIG. 4 is a block diagram of an illustrative client or server device.

FIG. 4 illustrates an exemplary client device 202 suitable for implementation in the networked system 200 of FIG. 3. The client device 202 may include a bus 220, a processor 222, a main memory 224, a read only memory (ROM) 226, a storage device 228, an input device 230, an output device 232, and a communication interface 234. The bus 220 may include one or more conventional buses that permit communication among the components of the client device 202. The processor 222 may be a conventional processor or microprocessor that interprets and executes instructions. The main memory 224 may include a random access memory (RAM) or another type of dynamic storage device that stores information and instructions for execution by the processor 222. The ROM 226 may include a conventional ROM device or another type of static storage device that stores static information and instructions for use by the processor 222. The storage device 228 may include a magnetic and/or optical recording medium, for example, and its corresponding drive.

The input device 230 may include one or more conventional mechanisms that permit a user to input information to the client device 202 such as a keyboard, a mouse, a pen, voice recognition and/or biometric mechanisms, etc. The output device 232 may include one or more conventional mechanisms that output information to the user, including a display, a printer, a speaker, etc. The communication interface 234 may include a transceiver-like mechanism that enables the client device 202 to communicate with other devices and/or systems. For example, the communication interface 234 may include mechanisms for communicating with another device or system via a network, such as network 208.

The client devices 202 may perform certain search and/or cluster generation operations such as those described herein. The client devices 202 may perform these operations in response to the processor 222 executing software instructions contained in a computer-readable medium, such as memory 224. A computer-readable medium may be defined as one or more memory devices. The software instructions may be read into memory 224 from another computer-readable medium such as the data storage device 228 or from another device via the communication interface 234. The software instructions contained in memory 224 causes processor 222 to perform search and/or hyperlink generation activities described herein. Alternatively, hardwired circuitry may be used in place of or in combination with software instructions to implement search and/or hyperlink generation processes described herein. Thus, the present invention is not limited to any specific combination of hardware circuitry and software.

The servers 204 and 206 may include one or more types of computer systems, such as a mainframe, minicomputer, or personal computer capable of connecting to the network 208 to enable servers 204, 206 to communicate with the client devices 202. In alternative implementations, the servers 204, 206 may include mechanisms for directly connecting to one or more client devices 202. The servers 204, 206 may transmit data over the network 208 or receive data from the network 208 via a wired or wireless connection. The servers 204, 206 may be configured in a manner similar to the client devices 202.

Figure 5:
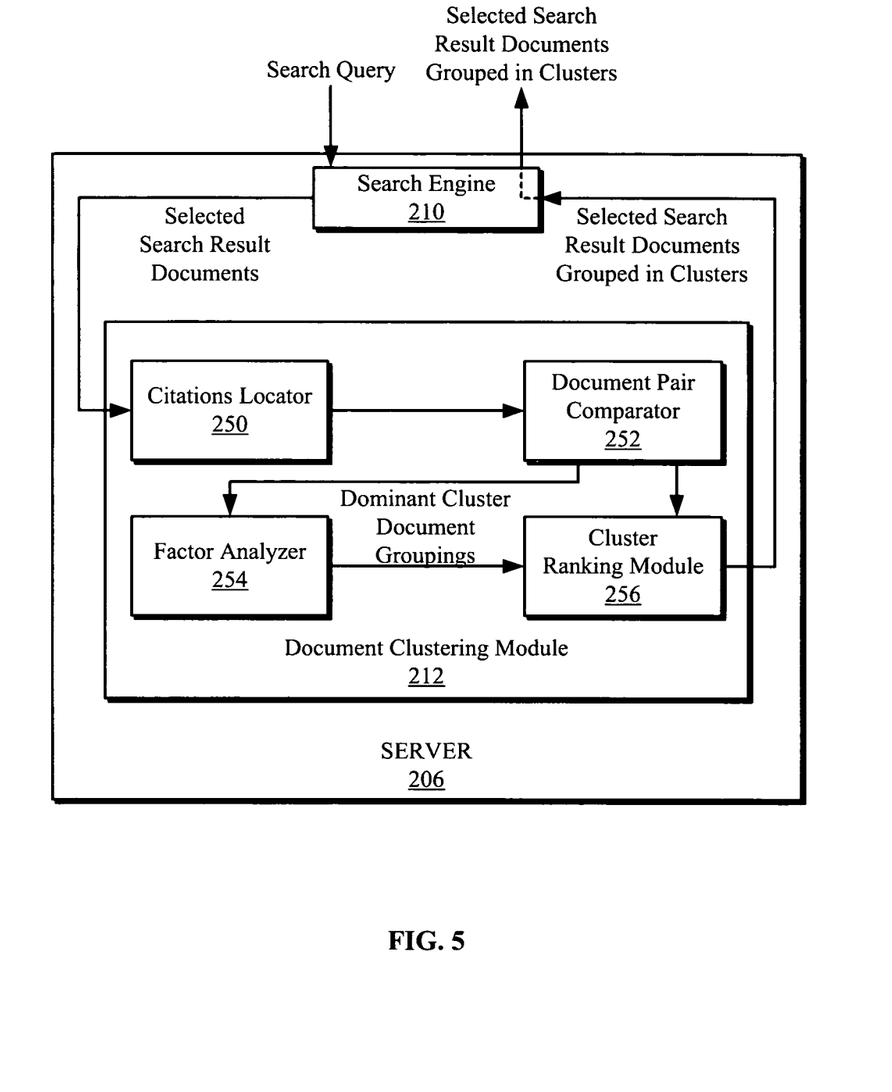
FIG. 5 is a block diagram illustrating a server implemented with a document clustering module in more detail.

The server 206 is an exemplary server implementing a search engine in communication with a document clustering module 212. FIG. 5 is a block diagram illustrating the server 206 and some of its components in more detail. As shown, the search engine 210 receives a search query and outputs search results. The document clustering module 212 may receive all the search results from the search engine 210 and/or may receive the selected search result documents as retrieved by another component of the server 206. The document clustering module 212 may include a citations or references locator 250 configured to locate citations in the selected search result documents. As noted above, the citations locator 250 may locate only references to other selected search result documents, to all search result documents, to all documents, or to another combination of documents, for example. The citations locator 250 outputs the located references to a document pair comparator 252 that determines the amount of overlap at various levels of generality, e.g., document level, paragraph level, citation level, or the like. The document pair comparator 252 outputs to a factor analyzer 254 and to a cluster ranking module. 256. The factor analyzer 254 determines possible document clusters by employing, for example, principal component analysis (PCA), principal factor analysis (PFA), or the like. The cluster ranking module 256 may analyze the possible clusters as output by the factor analyzer 254 to determine the dominant clusters. For example, the cluster ranking module 256 may assign a cluster score that may be, for example, an average of the weighted citation overlap score for each document pair in the cluster. The cluster ranking module 256 may adjust the cluster score by penalizing the score of each cluster for document pairs in the cluster that contain only document-level overlapping citations and/or only document-level and/or paragraph-level overlapping citations, for example. The cluster ranking module 256 determines the dominant clusters based on the adjusted scores for the clusters. For example, the cluster ranking module 256 may utilize a threshold for a maximum number of dominant clusters and/or a threshold for a minimum number of documents in a dominant cluster so as to generate coherent and logical dominant clusters that would be meaningful to the end user. The cluster ranking module 256 may also assign the documents that are not assigned to one of the dominant clusters to a catch-all or miscellaneous cluster. The cluster ranking module 256 then outputs, e.g., via the search engine 210, the search results grouped in accordance with the rankings of the dominant clusters.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for clustering documents using one or more processors, the method comprising:
    in each document in a collection of documents, locating citations, the citations including references to other documents;
    for each pair of one or more pairs of documents in the collection of documents, performing actions comprising:
    comparing the pair of documents based on overlapping citations at a first document structure level to generate a first citation overlap level, each of the overlapping citations at the first citation overlap level including common references to a same other document, the common references occurring at the first document structure level in each document of the pair;
    comparing the pair of documents based on overlapping citations at a second document structure level to generate a second citation overlap level, each of the overlapping citations at the second citation overlap level including common references to a same other document, the common references occurring at the second document structure level in each document of the pair, where the second document structure level is more specific than the first document structure level; and
    combining the first citation overlap level and the second citation overlap level to generate a citation overlap score for the pair of documents;
    determining a plurality of clusters of related documents in the collection of documents according to the citation overlap scores;
    ranking the plurality of clusters including:
    generating a weighted cluster citation overlap score for each pair of documents in each cluster of the plurality of clusters, and
    penalizing the weighted cluster citation overlap score for one or more clusters based on whether each cluster contains documents that contain only overlapping citations with other documents at the first document structure level;
    and
    providing a listing of the plurality of clusters of related documents based on the ranking.

2. The method of claim 1, wherein the actions comprise comparing the pair of documents based on overlapping citations on a third document structure level, the third document structure level being more specific than the second document structure level.

3. The method of claim 1, further comprising:
generating search results including a plurality of search result documents, the documents in the collection of documents being selected from the plurality of search result documents.

4. The method of claim 1, wherein the locating comprises locating only citations to the other documents in the collection of documents.

5. The method of claim 1, wherein the first and second document structure levels are selected from the group consisting of a document level, a paragraph level, a citation level, a page level, a chapter level, a section level, a subsection level, a sentence level, a multiple sentence level, and a word distance level.

6. The method of claim 1, further comprising:
determining a weighted citation overlap score based on an amount of overlapping citations at the first and second document structure levels.

7. The method of claim 6, wherein in determining the weighted citation overlap score, the amount of overlapping citations at the second document structure level is weighted more heavily than the amount of overlapping citations at the first document structure level.

8. The method of claim 1, wherein the determining comprises:
performing factor analysis using results from the comparisons.

9. The method of claim 8, wherein the factor analysis is selected from the group comprising principal component analysis (PCA) and principal factor analysis (PFA).

10. The method of claim 1, wherein ranking the plurality of clusters
includes determining one or more dominant clusters based on a cluster score, the cluster score being based on results of the comparisons.

11. A system comprising:
one or more computers configured to perform operations comprising:
in each document in a collection of documents, locating citations, the citations including references to other documents;
for each pair of one or more pairs of documents in the collection of documents, performing actions comprising:
comparing the pair of documents based on overlapping citations at a first document structure level to generate a first citation overlap level, each of the overlapping citations at the first citation overlap level including common references to a same other document, the common references occurring at the first document structure level in each document of the pair;
comparing the pair of documents based on overlapping citations at a second document structure level to generate a second citation overlap level, each of the overlapping citations at the second citation overlap level including common references to a same other document, the common references occurring at the second document structure level in each document of the pair, where the second document structure level is more specific than the first document structure level; and
combining the first citation overlap level and the second citation overlap level to generate a citation overlap score for the pair of documents;
determining a plurality of clusters of related documents in the collection of documents according to the citation overlap scores;
ranking the plurality of clusters including:
generating a weighted cluster citation overlap score for each pair of documents in each cluster of the plurality of clusters, and
penalizing the weighted cluster citation overlap score for one or more clusters based on whether each cluster contains documents that contain only overlapping citations with other documents at the first document structure level; and
providing a listing of the plurality of clusters of related documents based on the ranking.

12. The system of claim 11, wherein the actions comprise comparing the pair of documents based on overlapping citations in a third document structure level, the third document structure level being more specific than the second document structure level.

13. The system of claim 11, the operations further comprising generating search results including a plurality of search result documents, the documents in the collection of documents being selected from the search result documents.

14. The system of claim 11, wherein the locating comprises locating only citations to the other documents in the collection of documents.

15. The system of claim 11, wherein the first and second document structure levels are selected from the group consisting of a document level, a paragraph level, a citation level, a page level, a chapter level, a section level generality, a subsection level, a sentence level, a multiple sentence level, and a word distance level.

16. The system of claim 11, the operations further comprising determining a weighted citation overlap score based on an amount of overlapping citations at the first and second document structure levels.

17. The system of claim 16, wherein in determining the weighted citation overlap score, the amount of overlapping citations at the second document structure level is weighted more heavily than the amount of overlapping citations in the first document structure level.

18. The system of claim 11, wherein the determining comprises performing factor analysis using results from the comparisons.

19. The system of claim 18, wherein the factor analysis is selected from the group comprising principal component analysis (PCA) and principal factor analysis (PFA).

20. The system of claim 11, wherein ranking the plurality of clusters includes determining one or more dominant clusters based on a cluster score, the cluster score being based on results of the comparisons.

21. A computer program product embodied on a non-transitory computer-readable medium, the computer program product including instructions, which when executed by a computer system, are configured to cause the computer system to perform operations comprising:
in each document in a collection of documents, locating citations, the citations including references to other documents;
for each pair of one or more pairs of documents in the collection of documents, performing actions comprising:
comparing the pair of documents based on overlapping citations at a first document structure level to generate a first citation overlap level, each of the overlapping citations at the first citation overlap level including common references to a same other document, the common references occurring at the first document structure level in each document of the pair;

comparing the pair of documents based on overlapping citations at a second document structure level to generate a second citation overlap level, each of the overlapping citations at the second citation overlap level including common references to a same other document, the common references occurring at the second document structure level in each document of the pair, where the second document structure level is more specific than the first document structure level; and combining the first citation overlap level and the second citation overlap level to generate a citation overlap score for the pair of documents;

determining a plurality of clusters of related documents in the collection of documents according to the citation overlap scores;

ranking the plurality of clusters including:

generating a weighted cluster citation overlap score for each pair of documents in each cluster of the plurality of clusters, and penalizing the weighted cluster citation overlap score for one or more clusters based on whether each cluster contains documents that contain only overlapping citations with other documents at the first document structure level; and providing a listing of the plurality of clusters of related documents based on the ranking.

22. The computer program product of claim 21, wherein the actions comprise comparing the pair of based on overlapping citations in a third document structure level, the third document structure level being more specific than the second document structure level.

23. The computer program product of claim 21, further comprising instructions configured to cause the computer system to perform operations comprising:

generating search results including a plurality of search result documents, the documents in the collection of documents being selected from the plurality of search result documents.

24. The computer program product of claim 21, wherein the locating comprises locating only citations to the other documents in the collection of documents.

25. The computer program product of claim 21, wherein the first and second document structure levels are selected from the group consisting of a document level, paragraph level, a citation level, a page level, a chapter level, a section level, a subsection level, a sentence level, a multiple sentence level, and a word distance level.

26. The computer program product of claim 21, further comprising instructions configured to cause the computer system to perform operations comprising:

determining a weighted citation overlap score based on an amount of overlapping citations at the first and second document structure levels.

27. The computer program product of claim 26, wherein in determining the weighted citation overlap score, the amount of overlapping citations at the second document structure level is weighted more heavily than the amount of overlapping citations at the first document structure level.

28. The computer program product of claim 21, wherein the determining comprises:

performing factor analysis using results from the comparisons.

29. The computer program product of claim 28, wherein the factor analysis is selected from the group comprising principal component analysis (PCA) and principal factor analysis (PFA).

30. The computer program product of claim 21, wherein ranking the plurality of clusters includes determining one or more dominant clusters based on a cluster score, the cluster score being based on results of the comparisons.

* * * * *

UNITED STATES PATENT AND TRADEMARK OFFICE
CERTIFICATE OF CORRECTION

| | |
|---|---|
| PATENT NO. | : 8,612,411 B1 |
| APPLICATION NO. | : 10/750186 |
| DATED | : December 17, 2013 |
| INVENTOR(S) | : Vibhu Mittal |

It is certified that error appears in the above-identified patent and that said Letters Patent is hereby corrected as shown below:

In the Claims:

In Claim 22, column 11, line 27, after "pair of" insert -- documents --.

In Claim 25, column 12, line 6, before "paragraph" and insert -- a --.

Signed and Sealed this
First Day of April, 2014

Michelle K. Lee
*Deputy Director of the United States Patent and Trademark Office*